UNITED STATES PATENT OFFICE.

CHESTER S. HATHAWAY, OF QUINCY, MASSACHUSETTS, ASSIGNOR TO JOSEPH A. LOCKE, OF BOSTON, MASSACHUSETTS.

PAINT.

1,374,161.     Specification of Letters Patent.     Patented Apr. 5, 1921.

No Drawing.     Application filed March 24, 1920. Serial No. 368,281.

*To all whom it may concern:*

Be it known that I, CHESTER S. HATHAWAY, a citizen of the United States, residing at Quincy, in the county of Norfolk and State of Massachusetts, have invented a certain new and useful Improvement in Paint, of which the following is a specification.

My invention relates to the production of paints adapted for use in various industries. It has relation especially to the production of coating materials, however.

Among the many uses to which my invention may be applied are the following: The compositions may be used for protecting smoke stacks, locomotive boilers, gas tanks, structural steel and iron, metal containers, galvanized iron and tin roofs, and metal work of all kinds which is to be protected from the weather, acids, gases, heat and electrolysis. They are also applicable to the protection of wood surfaces for weather proofing and fireproofing, including a preservation of the surfaces of vehicles, railroad cars, ship decks, roofs, stucco building, telegraph and telephone poles and piles. They are also valuable for the waterproofing of concrete foundations and reservoirs and for protecting buildings from the staining action of chemical compounds. They are adapted also for the protection of hulls from fouling and as a material which may be used for calking the seams or cracks of vessels. They are applicable also to the coating of flexible fabrics as they are flexible to a very high degree. They are especially useful, furthermore, for paints as they may be applied at any time of the year without the temperature having any substantial influence upon the drying of the same. These compositions are useful also particularly for insulating purposes and for such purposes may be made either in the form of a paint or a paste for producing insulating blocks or covering electric cables, etc.

The object of my invention is to provide compositions of the above character and which are found advantageous in many different ways. The object of my invention is especially to provide compositions having an extraordinary degree of resistance to attacks of various kinds inasmuch as they contain as a base water gas tar and preferably the lightest grade thereof. Another object is to provide compositions containing materials which will effectively dry the water in the water gas tar notwithstanding the high percentage of water present and to provide substances which will enable the water gas tar to become effectively and homogeneously mixed with the other constituents of the compositions.

Further objects of my invention will appear from the detailed description thereof contained hereinafter.

While my invention is capable of embodiment in many different forms for the purpose of illustration I shall describe only certain forms of the same hereinafter.

For example, I may carry out my invention in any one of the following different ways.

To make a shingle coating which is not only fire resistant but waterproof, I mix together:

¼ bbl. Atlas Portland cement,
30 lbs. asbestos fiber,
15 lbs. precipitated resinate of manganese,
3 gals. water gas tar which may be any grade of the tar that collects in the gas mains of a water gas plant but which is preferably the upper one-half of the tar layer which is there collected and which contains 40 to 60% water,
1 gal. linseed oil, and
4 gals. naphtha or benzin.

The above are then ground together in a water cooled mill. The naphtha or benzin is used as a solvent of the resinate of manganese and these two constituents are valuable in bringing about the mixing of the Portland cement with the water gas tar. The asbestos fiber provides flexibility and strength to the composition and the linseed oil is an oily vehicle for the same. The Portland cement takes up the water from the water gas tar as well as from any other constituents containing water present. After the above have been ground together I add thereto:

25 gals. water gas tar of the same grade,
15 gals. linseed oil,
1 gal. of a solution of sodium silicate containing approximately 30–36 parts by weight of sodium silicate in 70–64 parts by weight of water,
7 gals. raw menhaden oil, preferably crude.

If desired, before the grinding, colors may be introduced and driers may be introduced after the grinding to any desired extent. The sodium silicate acts as a fire-proofing, thickening and hardening constituent and the menhaden oil is an oily vehicle to supplement the linseed oil.

A truck coating made in accordance with my invention may be made containing:
    65 gals. water gas tar of the same grade,
    25 gals. crude menhaden oil,
    30 lbs. resinate of manganese, and
    5 gals. of naphtha or benzin.
When these constituents have dissolved, there may be added to the same:
    5 gals. of any drier; and
    150 lbs. of my "special pigment".
To this may be added any desired quantity of colors. The "special pigment" referred to would, for example, be comprised of the following:
    18 lbs. Portland cement,
    3 lbs. asbestos fiber,
    1½ lbs. resinate of manganese,
    5 lbs. mineral red colors,
    2⅖ pts. water gas tar of the same grade,
    ¾ pt. linseed oil,
    1⅛ qts. naphtha,
    ½ pt. sodium silicate solution containing approximately 30–36 parts by weight of sodium silicate, 70–64 parts by weight of water, and
    2 qts. menhaden oil,
to which may be added, if desired:
    2½ gals. water gas tar of the same grade,
    1½ gals. linseed oil,
    ⅘ qt. menhaden oil crude; and any quantity of driers.

As a coating for iron I may make a composition containing:
    65 gals. water gas tar of the same grade,
    25 gals. crude menhaden oil,
    30 lbs. resinate of manganese,
    5 gals. naphtha or benzin.
When these materials have dissolved, I may add thereto:
    5 gals. of any drier; and
    100 lbs. of the "special pigment",
omitting therefrom the linseed oil. To this may be added other colors. If desired, especially for the first coating to be placed on iron I may omit the "special pigment" and substitute any other kind of colors and from this composition therefore, under these circumstances, the hydraulic cement will be absent.

As a smoke stack coating I may provide a composition containing:
    70 gals. water gas tar of the same grade,
    20 gals. crude menhaden oil,
    30 lbs. resinate of manganese,
    5 gals. naphtha or benzin,
to which may be added, when dissolved, if desired,
    5 gals. of any drier; and
    100 lbs. of the "special pigment"
leaving out the linseed oil. To this may be added other colors if desired.

As a marine coating, I may make a composition containing:
    70 gals. water gas tar of the same grade,
    20 gals. menhaden oil, crude,
    5 gals. soy bean oil,
    5 gals. of any drier,
    30 lbs. resinate of manganese,
    5 gals. naphtha or benzin,
    100 lbs. of the "special pigment".
When these materials have dissolved, I may add thereto any desired quantity of other colors, linseed oil being omitted.

As a coating for hulls of ships I may provide a composition containing:
    65 gals. water gas tar of the same grade,
    30 lbs. resinate of manganese,
    20 gals. naphtha or benzin,
    5 gals. menhaden oil, crude,
    10 gals. of any drier,
to which there may be added, when dissolved, if desired,
    250 lbs. of the "special pigment"
leaving out the linseed oil. To this I may add any other colors desired.

For coating canvas I may provide a composition containing:
    400 lbs. of the "special pigment",
    45 gals. water gas tar of the same grade,
    40 gals. menhaden oil, crude,
    30 lbs. resinate of manganese,
    5 lbs. naphtha or benzin,
    5 lbs. soy bean oil,
to which may be added when dissolved, if desired,
    5 gals. of any drier; and any desired quantity of colors.

To provide a coating for decks of ships I may make a composition containing:
    45 gals. water gas tar of the same grade,
    25 gals. menhaden oil, crude,
    30 lbs. resinate of manganese,
    15 gals. naphtha,
    9 gals. of any drier,
    7 gals. linseed oil,
to which may be added when dissolved, if desired,
    250 gals. of the "special pigment."
To this I may add any desired colors.

As a wood finish or spar varnish I may make a composition containing:
    2 gals. soy bean oil heated with 10 lbs. rosin added to the remaining constituents while hot,
    5 gals. water gas tar of the same grade,
    2¼ lbs. resinate of manganese,
    3 gals. naphtha or benzin.
To this I may add 6 quarts of crude menhaden oil for a natural finish. Also I may add any desired colors.

To provide a material for calking seams or cracks of ships I make a composition containing:
    10 gals. soy bean oil heated with 50 lbs. rosin added to the remaining constituents while hot, 30 gals. water gas tar of the same grade,
5 gals. menhaden oil, crude,
2 gals. of a solution of sodium silicate containing approximately 3-36 parts, by weight of silicate of sodium in 70-64 parts by weight of water,
½ bbl. hydraulic cement,
60 lbs. asbestos.

To give the desired color add any desired quantity of colors as for example 50 lbs. Venetian red colors. This composition should be melted to be flowed in when used.

To provide a cable cement or a coating for brass or copper pipes, I may make a composition containing:
10 gals. soy bean oil,
25 lbs. rosin,
1 gal. of a solution of sodium silicate containing 30-36 parts by weight of silicate of sodium in 70-64 parts by weight of water,
5 gals. menhaden oil, crude,
15 lbs. hydraulic cement, as for example Portland cement,
5 lbs. asbestos, short fiber.

These ingredients should be heated together and boiled for 20 minutes or until the mixture "ropes," that is will hang to a stick in the form of a rope. This particular composition is of a rubber like character and good for the casing of wires in the place of metal pipes. It is very fire resistant, and will wear very well as it is flexible.

To provide an insulating paint I may make a composition containing:
1 gal. water gas tar of the same grade,
1 qt. crude menhaden oil,
½ lb. resinate of manganese,
1 pt. benzin,
½ pt. any drier,
4 lbs. Portland cement,
2 lbs. asbestos,
1 qt. soy bean oil.

To this may be added any desired colors, from which linseed oil may be omitted, if desired. To mix the above product the resinate of manganese is dissolved in the benzin in a grinding machine, then the cement and asbestos and enough crude menhaden oil and water gas tar are added to make a proper mixture for grinding, which should be rather tacky, and the remaining ingredients are added thereto, after which all the ingredients are ground together.

To provide an insulating material in paste form which may be used for making insulating blocks and covering electric cables by wiping joints therewith, etc., I make a composition containing:
1 lb. Portland cement,
2 lbs. asbestos,
¼ lb. resinate of manganese,
which are crushed in a grinder after which I add to the same
2 qts. soy beans oil,
½ lb. rosin, and heat the entire mixture together until the rosin is thoroughly dissolved in the soy bean oil. To this I add
3 ozs. of a solution of sodium silicate containing 30-36 parts by weight of sodium silicate in 70-64 parts by weight of water,
1 pt. crude menhaden oil, and
1 pt. water gas tar of the same grade.

In order to provide a shingle stain, I may make a composition containing:
5 gals. water gas tar of the same grade,
1 gal. benzin,
3 lbs. silicate of manganese,
2 gals. benzin drier.

To this may be added any desired colors. The shingles may be either dipped in or painted with the shingle stain.

The materials appearing in the first example mentioned and which are contained also in the succeeding examples perform the same functions therein as in the first example. The soy bean oil is a drying oil. The rosin provides a finish or gloss and acts as a thickening and hardening agent.

In any of the above compositions where driers are used a drier that may be used would be the following:
1 gal. benzin,
½ pt. soy bean oil,
32 ozs. manganese dioxid.

Compositions made in this way will quickly harden irrespective of atmospheric conditions, although it has been found that the speed of hardening is somewhat increased indoors if light has access to the same. Furthermore, such compositions will readily harden under water.

While my invention is capable of embodiment in many different ways, I wish it to be understood that many changes may be made therein without departing from the spirit thereof.

I claim:

1. A composition containing a water gas tar and a hydraulic cement.

2. A composition containing a water gas tar of the lightest grade and a hydraulic cement.

3. A composition containing a tar, a hydraulic cement, resinate of manganese and a solvent for the resinate of manganese.

4. A composition containing a water gas tar, a hydraulic cement, resinate of manganese and a solvent for the resinate of manganese.

5. A composition containing a water gas tar of the lightest grade, a hydraulic cement, resinate of manganese and a solvent for the resinate of manganese.

6. A composition containing a tar, a hydraulic cement, resinate of manganese and a light petroleum hydrocarbon.

7. A composition containing a water gas tar, a hydraulic cement, resinate of manganese and a light petroleum hydrocarbon.

8. A composition containing a water gas tar of the lightest grade, a hydraulic cement, resinate of manganese and a light petroleum hydrocarbon.

9. A composition containing a tar, a hydraulic cement, resinate of manganese, a light petroleum hydrocarbon and an oily vehicle.

10. A composition containing a water gas tar, a hydraulic cement, resinate of manganese, a light petroleum hydrocarbon and an oily vehicle.

11. A composition containing a water gas tar of the lightest grade, a hydraulic cement, resinate of manganese, a light petroleum hydrocarbon, and an oily vehicle.

12. A composition containing a tar, a hydraulic cement, resinate of manganese, a light petroleum hydrocarbon and menhaden oil.

13. A composition containing a water gas tar, a hydraulic cement, resinate of manganese, a light petroleum hydrocarbon and menhaden oil.

14. A composition containing a water gas tar of the lightest grade, a hydraulic cement, resinate of manganese, a light petroleum hydrocarbon and manhaden oil.

15. A composition containing a tar, a hydraulic cement, resinate of manganese, a light petroleum hydrocarbon, menhaden oil and a drying oil.

16. A composition containing a water gas tar, a hydraulic cement, a resinate of manganese, a light petroleum hydrocarbon, menhaden oil and a drying oil.

17. A composition containing a water gas tar of the lightest grade, a hydraulic cement, a resinate of manganese, a ligh petroleum hydrocarbon, menhaden oil and a drying oil.

18. A composition containing a tar, a hydraulic cement, resinate of manganese, a light petroleum hydrocarbon, menhaden oil, a drying oil and asbestos fiber.

19. A composition containing a water gas tar, a hydraulic cement, resinate of manganese, a light petroleum hydrocarbon, menhaden oil, a drying oil and asbestos fiber.

20. A composition containing a water gas tar of the lightest grade, a hydraulic cement, resinate of manganese, a light petroleum hydrocarbon, menhaden oil, a drying oil and asbestos fiber.

21. A composition containing a tar, a hydraulic cement, resinate of manganese, a light petroleum hydrocarbon, menhaden oil, a drying oil, asbestos fiber and sodium silicate.

22. A composition containing a water gas tar, a hydraulic cement, resinate of manganese, a light petroleum hydrocarbon, menhaden oil, a drying oil, asbestos fiber and sodium silicate.

23. A composition containing a water gas tar of the lightest grade, a hydraulic cement, resinate of manganese, a light petroleum hydrocarbon, menhaden oil, a drying oil, asbestos fiber and sodium silicate.

24. A composition adapted to harden containing water gas tar.

25. A composition adapted to harden containing water gas tar of the lightest grade.

In testimony that I claim the foregoing I have hereunto set my hand.

CHESTER S. HATHAWAY.